Jan. 17, 1967  E. G. BURDICK  3,298,652
HOOK MOUNTING AND HOOK THEREON
Filed March 17, 1965

INVENTOR
EARL G. BURDICK
BY
Gardner & Zimmerman
ATTORNEYS

United States Patent Office 3,298,652
Patented Jan. 17, 1967

3,298,652
HOOK MOUNTING AND HOOK THEREON
Earl G. Burdick, 9435 C St., Oakland, Calif. 91761
Filed Mar. 17, 1965, Ser. No. 440,463
5 Claims. (Cl. 248—361)

This invention relates to hook mountings and more particularly to an improved hook mounting for mounting hooks on surfaces and in which the hook is movable between an exposed usable position and a concealed position.

Various types of hooks and hook mountings have been designed in the past for securing ropes, chains and the like to surfaces. For example, hooks have been mounted in various ways on truck beds and side panels to provide a means for securing cargo tie-down ropes, cables and chains. Whenever hooks are mounted on surfaces which are frequently contacted by personnel, cargo or equipment, it is desirable to be able to completely conceal or cover such hooks to prevent them from snagging the clothing of the personnel or catching onto the cargo or equipment.

Hook mountings for surfaces in which the hook is retractable from the surface to provide a substantially unbroken smooth surface are now available. However, with most types of such hooks, a surface of the hook itself acts as a continuation of the mounting surface when the hook is in the retracted position. This seriously limits the type of hook configuration which can be used with such mountings. Further, such hook mountings are generally complicated, and also require a relatively large space beneath the surface in which to be concealed when in the retracted position.

Accordingly, an object of the present invention is to provide an improved and simple hook mounting for surfaces in which a hook thereon is movable between an exposed usable position and a fully concealed position when not in use.

Another object of the invention is to provide a hook and hook mounting for a surface in which the hook is movable to a concealed position beneath the surface, and a substantially unbroken flush surface configuration is provided when such hook is in the concealed position.

A further object of the invention is to provide a hook mounting for mounting hooks on surfaces which is adaptable for mounting hooks of various types and configurations.

One other object is to provide a hook mounting for mounting hooks on a surface in which the hook is pivotable between a concealed inoperative position and various exposed usable positions.

Still another object of the invention is to provide a hook mounting adapted to conceal a hook thereon when such hook is not in use and which can be easily mounted on a surface.

A still further object of the invention is to provide a hook and hook mounting in which the hook is pivotal in the direction of a pulling force on such hook to assure that the means producing the pulling force stays secured to the hook.

The invention possesses other objects and features of advantage, some of which with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to the drawings.

Generally, the hook mounting of the invention includes a hook mounting plate having one surface adapted to have a hook affixed thereto and having an opposite surface with a configuration generally conforming to the configuration of the surface to which the hook is to be mounted. This plate is mounted for pivotal movement about an axis which is parallel to the surface to which the hook is to be mounted in order that such plate can be pivoted to various positions exposing the hook and to a position in which the hook is concealed. When the hook is in the concealed position, the mounting plate acts generally as a continuation of the surface to which it is mounted.

Figure 1:
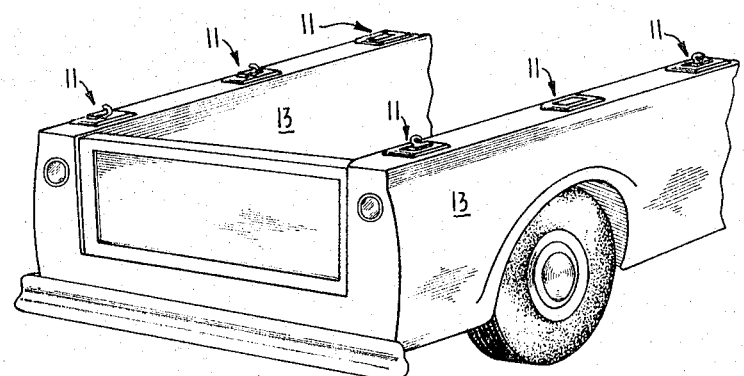
FIGURE 1 is a perspective view of a portion of a truck body depicting a plurality of hooks and hook mountings of the invention on the truck bed side panels, and in which some of the hooks are in an exposed usable position and some are concealed.

A preferred embodiment of the invention is shown in FIGURES 1 through 5 of the drawing. In FIGURE 1, a plurality of hook and hook mounting assemblies, generally indicated by the reference numeral 11, are depicted mounted on panel top surfaces 12 of truck body side panels 13. Several of these hook and hook mounting assemblies are shown with the hooks thereof in an exposed usable position while the rest of such assemblies are shown with the hooks thereof in a completely concealed position.

Figure 5:
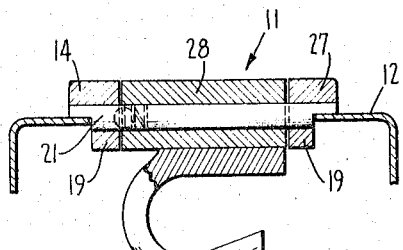
FIGURE 5 is a cross sectional view of the hook mounting and hook of FIGURE 2 mounted on a truck side panel and taken on a plane along the line 5—5 of FIGURE 4.

As depicted in FIGURES 2 through 5, each hook and hook mounting assembly 11 includes a generally rectangular frame structure 14. This frame structure fits about an aperture in the panel top surface 12 and is suitably secured to the panel surface such as by bolt and nut assemblies 16. As depicted, each of the frame holes 17 through which a bolt is to pass, is beveled, and the bolts have counter-sunk heads in order that such bolts do not project above the frame 14 and thereby form snagging protuberances. Further, as best seen in FIGURE 5, the lateral edges 18 of the frame structure 13 are rounded off in order to prevent snagging and catching.

The ease with which the hook mounting assembly can be mounted onto a surface is readily apparent. It is only necessary to cut through the surface four bolt holes and an aperture about which the frame structure is to fit. Thereafter the frame structure can simply be bolted to the surface about such aperture.

Figures 2, 3:
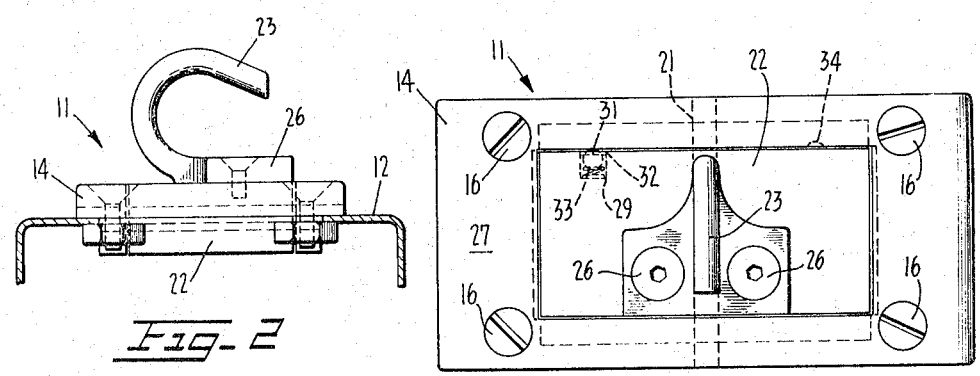
FIGURE 2 is a cross sectional view of a truck panel of FIGURE 1 depicting a hook and hook mounting of the invention secured thereto.
FIGURE 3 is a plan view of the hook mounting and hook of FIGURE 2.
Figure 4:
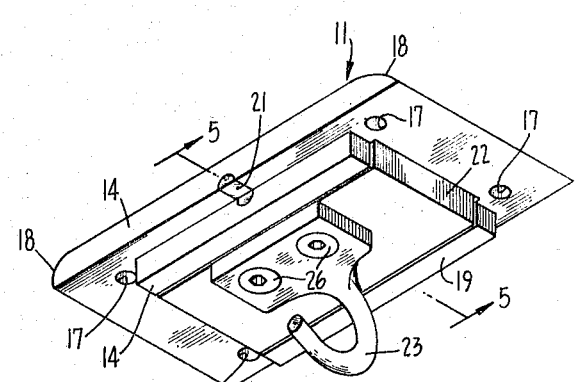
FIGURE 4 is a perspective view of the hook mounting and hook of FIGURE 2 depicting the hook in a concealed position.

Frame structure 14 includes on the under surface thereof two longitudinally extending blocks 19 which project into the aperture in the panel surface 12. Blocks 19 and frame structure 14 cooperate to rigidly hold a pivot pin 21 laterally across the frame structure with its axis bisecting the opening through the frame structure and being in the plane of panel surface 12. A pivot plate 22 is pivotally mounted within frame 14 for rotation about pin 21. A hook, for example, single prong hook 23, is suitably affixed to surface 24 of plate 22 such as by countersunk screws 26. As mentioned before, the hook can be of any desired type of configuration. It is only necessary that the hook be able to pass by the frame structure 14 when the pivot plate 22 is pivoted about pin 21 from a hook exposing position as shown in FIGURES 2 and 3 to a hook concealing position as shown in FIGURES 4 and 5. Of course, it is to be appreciated that frame structure 14 and plate 22 can be modified to allow a hook of a desired configuration to pass by such frame structure.

As depicted in FIGURE 3, hook 23 is affixed to plate 22 directly above pin 21 and extending radially outward from the axis thereof. Therefore, if a rope should be attached to the hook at an oblique angle with respect to the frame structure 14, the plate 22 will pivot to a position whereby such rope will be in a plane perpendicular to the plate. That is, the hook 23 will always swing toward the direction of any pulling force on such hook, and lie in the same plane as the force. This is advantageous with many types of hooks since it is not practical to design such hooks so that a rope or the like secured thereto will remain so secured irrespective of the angle such rope makes with the hook. For example, with reference to FIGURES 2 and 3 of the drawings, it is seen that the bight of the hook 23 is relatively ineffective to hold a rope or the like on the hook if such rope should be substantially horizontal with respect to the frame structure 14 and the hook is in the position shown. With the present invention, however, the hook swings in the direction of the rope to a position in a plane with such rope, and thereby, presents an effective bight to the rope.

The fact that the hook 23 is mounted directly above pin 21 also has another advantage. Any pulling force on the hook will be directly transmitted to such pin and, therefore, no shearing force or oblique bending moment will be present on the hook or plate 22. Thus, plate 22 need not be a solid, structurally strong plate as long as the portion of it around pin 21 is sufficiently strong to prevent the plate from being pulled from the pin. It is to be noted that pin 21 extends for the full width of frame structure 14 to distribute any pulling load to such frame structure along its full width. In this regard, the ends of pin 21 are cut away to conform to the configuration formed by frame 14 and blocks 19 in order that frame 13 can be affixed flush to surface 12 without the necessity of cutting special notches therein to accommodate the pin.

Plate 22 is adapted to be substantially flush with the upper surface 27 of the frame structure and provide an unbroken continuation thereof when the hook is in the concealed position. When such plate is planar with frame 14, e.g., when it is in a hook concealing position, the perimeter of the pivot plate is contiguous with the inner perimeter of frame 14. Moreover, the distance from pivot plate surface 28, which is the surface opposite the surface to which hook 23 is affixed, to the axis of pin 21 is substantially equal to the distance from frame structure upper surface 27 to such pin. Therefore, as depicted in FIGURE 5, when the hook is in the concealed position, surface 28 is flush with and acts as a continuation of surface 27.

Means are provided to index and lock plate 22 in the hook concealing position with such plate flush with the frame structure. That is, plate 22 has a cylindrical bore 29 extending into a longitudinal side thereof. An indexing ball 31 is held within bore 29 by a ring 32, and is urged outward by a compressed spring 33 against the ring with a portion thereof protruding beyond such ring. An indexing cavity 34 is provided on the corresponding inner longitudinal side of frame structure 14 to receive ball 31 when the plate 22 is in the hook concealing position and thus maintain the plate in such position with its surface 28 substantially flush with the frame structure surface 27.

It is to be appreciated that while there is no indexing cavity provided to index the plate in a hook exposing position, ball 31 engages the frame in such a position to prevent the plate from pivoting when a rope or the like is being secured to the hook. That is, ball 31 frictionally engages the inner side of the frame when the hook is in the fully exposed position and because of the friction between such ball and the frame, plate 22 is not freely pivotal at such time. Of course, if it is desirable to be able to lock and index the plate in a hook exposing position, an indexing cavity can be provided in the frame to receive ball 31 for such purpose. However, when locked into such a position, it is to be realized that plate 22 is not freely pivotal to assure that hook 23 is always in the plane of a pulling force as discussed above.

When the plate 22 is in the hook concealing position, it is to be noted that no more space is required below surface 12 than is taken up by such hook. This is in contrast to most types of concealable hooks in which the hook is retractable. In such retractable types of concealable hooks, more space is usually needed in order to accommodate the hook and its associated retractable mounting parts. Thus, the present invention can be utilized for mounting a concealable hook on many surfaces in which space below such surface is at a premium. Further, it is to be noted that the hook mounting of the invention is not limited to mounting hooks on truck panels or beds. It can be used to mount a hook on any wall surface.

Figure 6:
FIGURE 6 is a cross sectional view through a truck side panel depicting another hook mounting and hook of the invention.

Another embodiment of the invention is depicted in FIGURE 6. In this embodiment, the frame structure 14' of the hook mounting of the invention rests upon ledges 36 formed below the surface of panel 12 longitudinally of the hook mounting receiving aperture therein. The ledges 36 are a distance below surface 12 equal to the depth of the frame structure. Thus, such frame structure lies flush with the panel surface 12 and provides a substantially unbroken surface thereof when the hook is in the concealed position shown. In this regard it should be noted that none of the edges of the frame structure 14' are rounded off as was the case in the earlier described embodiment. The hook 23' of this embodiment is a double pronged hook and is illustrated as such to further emphasize the fact that many different configurations of hooks can be used with the mounting assembly of this invention.

What is claimed is:

1. A hook and a hook mounting for mounting said hook onto a wall surface comprising a frame structure adapted to be mounted to a wall surface about an aperture therethrough and with an upper surface of such structure being substantially parallel to the wall surface, a plate mounted to said frame structure for pivotal movement through said aperture about an axis substantially within the plane of a wall surface, a hook mounted to a first surface of said plate, said plate being pivotal between positions in which said hook is exposed with respect to the wall surface and a position in which said hook is concealed with respect to the wall surface and a second surface of said plate opposite to said first surface lies flush with and is a continuation of said upper surface of said frame structure.

2. The hook and hook mounting structure of claim 1 wherein indexing means are provided to selectively maintain said plate in a hook concealing position.

3. A hook and hook mounting structure comprising a frame structure defining a central opening and adapted to be mounted to a wall surface about an aperture through the surface with the upper surface of said frame structure substantially parallel to the wall surface, a pivot pin secured to said frame structure and extending laterally across said opening with its axis bisecting said opening, a plate having a hook mounted on a first surface thereof pivotally mounted on said pin for pivotal movement through said opening, the peripheral edge configuration of said plate generally conforming to the boundary of said opening and said plate being pivotal between first positions in which said hook is exposed with respect to the wall surface and a second position in which said hook is concealed with respect to the wall surface and in which a second surface of said plate opposite to said first surface lies flush with and is a continuation of the upper surface of said frame structure, said plate being freely pivotal when in said first positions and said hook being mounted on said first surface over the axis of said pin and radially with respect thereto whereby a pulling force on said hook will pivot said hook into alignment with the direction of said force.

4. The hook and hook mounting structure of claim 3 wherein the peripheral edge configuration of said plate and the boundary of the opening are generally rectangular.

5. A hook and a hook mounting for mounting the hook onto a wall surface comprising a plate mounted to pivot with respect to the wall surface about an axis parallel to the surface, a hook mounted over said axis radially with respect thereto on a first surface of said plate, said plate being pivotal between first positions exposing said hook and a second position concealing said hook with respect to the wall surface onto which the hook is to be mounted, said plate being freely pivotal about said axis when it is in said first positions whereby a pulling force on said hook will pivot said hook into alignment with a direction of said force.

References Cited by the Examiner

UNITED STATES PATENTS

| | | | |
|---|---|---|---|
| 1,402,496 | 1/1922 | Hoffman | 114—218 |
| 3,102,708 | 9/1963 | Crain | 248—361 |
| 3,212,746 | 10/1965 | Wright | 248—361 |

CLAUDE A. LE ROY, *Primary Examiner.*

J. F. FOSS, *Assistant Examiner.*